United States Patent [19]

Seltzer et al.

[11] 3,846,422

[45] Nov. 5, 1974

[54] 4,6-BIS(ALKARYL)-S-TRIAZINES

[75] Inventors: Raymond Seltzer, New City; David A. Gordon, Scarsdale, both of N.Y.

[73] Assignee: Ciba-Geigy Corporation, Ardsley, N.Y.

[22] Filed: May 1, 1972

[21] Appl. No.: 248,839

[52] U.S. Cl.... 260/248 CS, 260/249.5, 260/88.3 R, 260/243 A, 260/244 R
[51] Int. Cl. ...................... C07d 55/50, C07d 55/18
[58] Field of Search....... 260/248 CS, 249.5, 243 A, 260/244 R

[56] References Cited
UNITED STATES PATENTS

| | | | |
|---|---|---|---|
| 3,203,550 | 8/1965 | Schaefer | 260/248 |
| 3,268,474 | 8/1966 | Hardy et al. | 260/248 X |
| 3,344,137 | 9/1967 | Bader | 260/248 X |
| 3,423,360 | 1/1969 | Huber et al. | 260/248 X |
| 3,444,164 | 5/1969 | Luethi et al. | 260/248 |
| 3,478,024 | 11/1969 | Altermatt | 260/248 |

*Primary Examiner*—John M. Ford
*Attorney, Agent, or Firm*—Karl F. Jorda

[57] ABSTRACT

4,6-bis(alkaryl)-s-triazines having the structure

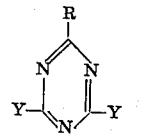

wherein
R is hydrogen, alkyl, aryl, amino, carboxyl, nitrogen heterocyclic or a diarylamino group, and
Y is an alkyl substituted aromatic group, can be prepared by a Freidel-Crafts reaction from cyanuric chloride and an alkyl substituted aromatic compound. These compounds are useful in preparing s-triazine anhydrides which in turn are useful in preparing high temperature polyimide polymers.

6 Claims, No Drawings

4,6-BIS(ALKARYL)-S-TRIAZINES

DETAILED DISCLOSURE

This invention relates to novel s-triazine derivatives having the structure

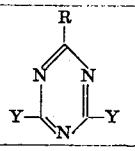

wherein

R is a hydrogen, alkyl, aryl group, amino, carboxyl, nitrogen heterocyclic or a diarylamino group and Y is an alkyl substituted aromatic group.

Illustrative examples of R groups are alkyl, phenyl, biphenylyl, naphthyl, diphenylamino or dinaphthylamino. The preferred groups are phenyl and diphenylamino groups.

The R group can also be a heterocyclic group containing nitrogen atoms in the ring. Illustrative examples of such heterocyclic group are:

a. A group having the structure

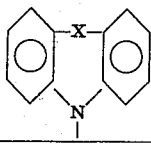

where X is as defined below. When X is a covalent bond the resulting group would be a 9-carbozolyl; when X is oxygen the group would be a 10-phenoxazinyl and when X is sulfur the group would be a 10-phenothiazinyl, b. a 1indolyl group having the structure

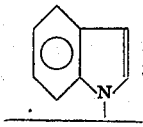

c. a 2-isoindolyl group having the structure

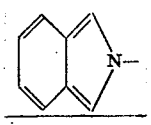

d. a 1-imidazolyl having the structure

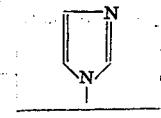

e. a 1-pyrroloyl having the structure

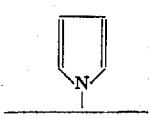

By alkyl group referred to above is meant a straight or branched chain alkyl group having up to four carbon atoms, such as methyl, ethyl, n-propyl, isopropyl, n-butyl and the like. By aryl is meant phenyl, naphthyl, biphenyl or an aryl group substituted with a lower alkyl, halogen or a lower alkoxy group. The lower alkyl group has one to four carbon atoms.

The compounds of this invention can be prepared by reacting one mole of a substituted dichloro-s-triazine and two moles of the desired dialkyl substituted aromatic compound such as ortho-xylene in the presence of aluminum chloride. Another method for the preparation of these compounds is by reacting two moles of a dialkyl substituted aromatic nitrile such as 3,4-dimethylbenzonitrile with 1 mole of aroyl chloride such as benzoyl chloride, in the presence of aluminum chloride and ammonium chloride. The various methods of the preparation of these compounds is described in greater detail in the examples below.

The compounds of this invention are useful for preparing tetracarboxylic dianhydrides, which in turn, can be used to prepare the various polymers such as polyimides, and the like. The dianhydrides may be prepared by oxidizing the tetraalkyl substituted aromatic s-triazines, such as 2-phenyl-4,6-bis(3',4'-dimethylphenyl)-s-triazine with potassium permanganate which would yield the corresponding tetracarboxylic derivative which, in turn, could be dehydrated to yield the dianhydride. The preparation of said dianhydrides is described in greater detail in the copending application filed on May 1, 1972, Ser. No. 248,838. The dianhydrides can then be used to prepare a polyimide. The preparation of such polymers are described in greater detail in the copending application filed on May 1, 1972, Ser. No. 248,837.

EXAMPLE 1

Preparation of 2-phenyl-4,6-bis (3',4'-dimethylphenyl)-s-triazine

Procedure A

To a mixture of 22.6 g (0.10 mole) of 2-phenyl-4,6-dichloro-s-triazine and 200 ml. of o-xylene was added 26.6 g (0.20 mole) of aluminum chloride. The reaction was slowly brought to reflux, and refluxed for 24 hours. After cooling, the reaction mixture was poured over ice and steam distilled. The water was decanted from the pot residue. The remaining solid was washed with acetone to give 30.4 g of product, m.p. 208°–210°.

Procedure B

To a mixture of 20.0 g (0.16 mole) of 3,4-dimethylbenzonitrile, 8.75 g (0.063 mole of benzoyl chloride, 5 ml of thionyl chloride and 100 ml of o-dichlorobenzene was added 8.35 g (0.063 mole) of aluminum chloride. The reaction was heated to 95° over a 30 minute period and heated at this temperature for 2 hours. Ammonium chloride, 4.30 g (0.080 mole), was added, and the resulting reaction mixture was heated at 130° for 17 hours. After cooling, the reaction was poured over ice and steam distilled. The pot residue was filtered. The residue was washed with water and then with acetone to give 10.4 g of product, m.p. 203°–207°. Recrystallization from DMF gave an analytical sample, m.p. 204°–207°.

Analysis for $C_{25}H_{23}N_3$:
| | | | |
|---|---|---|---|
| Calculated: | C, 82.13; | H, 6.34; | N, 11.53 |
| Found: | C, 82.17; | H, 6.16; | N, 11.43 |

EXAMPLE 2

Preparation of 2-diphenylamino-4,6-bis-(3',4'-dimethylphenyl)-s-triazine

To a solution of 1.58 g (0.05 mole) of 2-diphenylamino-4,6-dichloro-s-triazine in 250 ml of o-xylene was added 22.0 g (0.16 mole) of aluminum chloride. The reaction mixture was refluxed for 20 hours. After cooling, the reaction mixture was poured over ice and steam distilled. The water was decanted from the pot residue, and the remaining solid was washed with acetone to give 15.8 g of product, m.p. 219°–224°. Recrystallization from acetonitrile gave an analytical sample, m.p.

| Analysis for $C_{31}H_{38}N_4$: | | | |
|---|---|---|---|
| Calculated: | C, 81.70; | H, 6.05; | N, 12.25 |
| Found: | C, 81.63; | H, 6.28; | N, 12.45 |

EXAMPLE 3

Preparation of 2-(p-biphenylyl)-4,6-bis (3',4'-dimethylphenyl)-s-triazine

Following Procedure A in Example 1, 2-(p-biphenylyl)-4,6-dichloro-s-triazine is reacted with o-xylene in the presence of aluminum chloride to yield the desired product.

EXAMPLE 4

Preparation of 2-methyl-4,6-bis (3',4'-dimethylphenyl)-s-triazine

Following Procedure A in Example 1, 2-methyl-4,6-dichlorophenyl-s-triazine is reacted with o-xylene in the presence of aluminum chloride to yield the desired product.

EXAMPLE 5

Preparation of 2-(9-carbazolyl)-4,6-bis(3',4'-dimethylphenyl)-s-triazine

Carbazole and cyanuric chloride is reacted according to a known procedure to yield 2-(9-carbazolyl)-4,6-dichloro-s-triazine. This compound is in turn reacted in the presence of aluminum chloride following the procedure of Example 1, yielding the above named product.

What is claimed is:

1. A 4,6-bis(alkaryl)-s-triazine compound having the formula

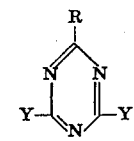

wherein

R is hydrogen, a straight or branched chain alkyl group having up to four carbon atoms, carboxyl, amino, phenyl, naphthyl, biphenyl or one of such aryl groups substituted with a lower alkyl group, halogen or a lower alkoxy group, diphenylamino, dinaphthylamino or a heterocyclic group selected from (a) 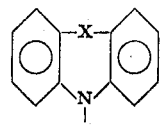

wherein X is oxygen, sulfur or a covalent bond, (b) 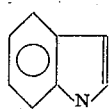

(c) 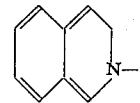

(d) 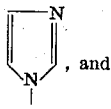, and (e) 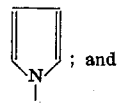; and

Y is a dialkyl substituted phenyl or naphthyl group where said alkyl groups having one to four carbon atoms.

2. The compound of claim 1 which is 2-phenyl-4,6-bis(3',4'-dimethylphenyl)-s-triazine.

3. The compound of claim 1 which is 2-diphenylamino-4,6-bis(3',4'-dimethylphenyl)-s-triazine.

4. The compound of claim 1 which is 2-diphenylamino-4,6-bis(3',4'-dimethylphenyl)-s-triazine.

5. The compound of claim 1 which is 2-(p-biphenylyl)-4,6-bis(3',4'-dimethylphenyl)-s-triazine.

6. The compound of claim 1 which is 2-methyl-4,6-bis(3',4'-dimethylphenyl)-s-triazine.

* * * * *